(12) United States Patent
Damitz et al.

(10) Patent No.: US 7,295,917 B2
(45) Date of Patent: Nov. 13, 2007

(54) METHOD FOR DETERMINING A COMBUSTION CHAMBER PRESSURE

(75) Inventors: Jens Damitz, Illingen (DE); Michael Kessler, Warmbronn (DE); Ulrich Sommers, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 11/259,872

(22) Filed: Oct. 26, 2005

(65) Prior Publication Data
US 2006/0095198 A1    May 4, 2006

(30) Foreign Application Priority Data
Oct. 26, 2004    (DE)    ............... 10 2004 051 908

(51) Int. Cl.
*F02D 41/00*    (2006.01)
(52) U.S. Cl. ............... 701/114; 123/435; 73/117.3
(58) Field of Classification Search ............... 701/114, 701/102, 115; 123/435; 73/115, 117.3
See application file for complete search history.

(56) References Cited

U.S. PATENT DOCUMENTS 4,160,432 A * 7/1979 Tsutsumi ............... 123/256
4,538,454 A * 9/1985 Aono ............... 73/115
6,192,858 B1 * 2/2001 Nieberding ............... 123/323

FOREIGN PATENT DOCUMENTS

DE    100 28 885 A1 * 12/2001
EP    0411 580 A1    2/1991
JP    2006-274966 A * 10/2006

OTHER PUBLICATIONS

Bassin et al., *High-Voltage Device for 0.5-μm Standard CMOS Technology*, IEEE Electron Device Letters, vol. 21, No. 1, Jan. 2000, pp. 40-42.

* cited by examiner

*Primary Examiner*—Hieu T. Vo
(74) *Attorney, Agent, or Firm*—Kenyon & Kenyon LLP

(57)    ABSTRACT

A method for determining a combustion chamber pressure of an internal combustion engine is described, which is used for a simple and accurate correction of the determined combustion chamber pressure. For this purpose, a first time curve of the combustion chamber pressure is compared with a second time curve of the combustion chamber pressure. A correction factor is determined as a function of the comparison result. The determined combustion chamber pressure is corrected via the correction factor.

9 Claims, 3 Drawing Sheets ical view of an internal
METHOD FOR DETERMINING A COMBUSTION CHAMBER PRESSURE

FIELD OF THE INVENTION

The present invention is directed to a method for determining a combustion chamber pressure of an internal combustion engine.

BACKGROUND INFORMATION

Methods for determining a combustion chamber pressure of an internal combustion engine are known. Combustion chamber pressure sensors, which measure the combustion chamber pressure in a cylinder of the internal combustion engine and output a corresponding measuring signal may be used for this purpose, for example. However, the signals of the combustion chamber pressure sensors are error prone. If these errors are not corrected, they corrupt the cylinder pressure characteristics calculated from the measured combustion chamber pressure values and, when these cylinder pressure characteristics are adjusted, result in wrong absolute values and thus in a possible imbalance among the cylinders of the internal combustion engine. Different cylinder pressure characteristics, such as an indicated combustion chamber mean pressure or certain conversion points of the heating curve, may be calculated from the combustion chamber pressure curve. A cylinder-individual regulation may be based on these cylinder pressure characteristics. By regulating the indicated combustion chamber mean pressure of the cylinders, for example, it is possible to achieve a more accurate adjustment of the setpoint torques and better balancing of the cylinders in all operating ranges.

For correcting an offset of a combustion chamber pressure sensor or a cylinder pressure sensor, European Published Patent Application No. 0411 580 describes a method for determining cylinder pressure values during an intake stroke of a cylinder and comparing them with a predefined reference minimum value. The differences between the determined cylinder pressure values and the predefined reference minimum value are then used as offset correction values.

SUMMARY OF THE INVENTION

The method according to the present invention for determining a combustion chamber pressure, of an internal combustion engine in particular, has the advantage over the related art in that a first time curve of the combustion chamber pressure is compared with a second time curve of the combustion chamber pressure, a correction factor is determined as a function of the comparison result, and the determined combustion chamber pressure is corrected using the correction factor. In this way, formation of the correction factor is based on the comparison of two time curves of the combustion chamber pressure and not only on one predefined reference value, making formation of the correction factor less sensitive to interference. The accuracy of the cylinder pressure analysis or the combustion chamber pressure analysis may thus be improved.

It is particularly advantageous when a combustion chamber pressure value is determined from the first time curve and the second time curve of the combustion chamber pressure at multiple reference points which are predefined equally for both time curves, when, for at least two reference points, the associated combustion chamber pressures of the first time curve and the second time curve are brought into relation to one another, and when a mean straight line is determined which shows the relationship between the combustion chamber pressures of the two time curves associated with one another via the at least two reference points, and when the correction factor is formed as a function of the slope of the mean straight line. In this way, it is possible to determine the correction factor mathematically, in particular graphically, in a particularly simple and precise manner. By using the mean straight line, the relationship between the combustion chamber pressures of the two time curves associated with one another via the at least two reference points is averaged so that, also in this way, the sensitivity to interference may be reduced and the accuracy of the cylinder pressure analysis or combustion chamber pressure analysis may be improved.

It is particularly advantageous when crankshaft angles or absolute points in time are selected as the reference points. The time curve of the combustion chamber pressure is normally plotted against the crankshaft angles or the absolute points in time anyway, so that the reference points may be determined particularly easily.

It is also particularly advantageous when different time intervals or angle distances from a characteristic situation in the combustion cycle of an associated cylinder of the internal combustion engine, which is predefined equally for both time curves of the combustion chamber pressure, are selected as reference points. In this way, the determination of the reference points implicates a calibration of the two time curves, so that, for both time curves, the selected reference points represent the same situations in the combustion cycle of the associated cylinder. Additional calibrating of the two time curves is thus not necessary. However, it is also advantageous when the first time curve and the second time curve of the combustion chamber pressure are calibrated to a characteristic situation of the combustion cycle of an associated cylinder of the internal combustion engine. If such a calibration of the two time curves of the combustion chamber pressure is carried out, the reference points may subsequently be determined in a particularly simple manner by merely predefining appropriate absolute crankshaft angles or absolute points in time.

A further advantage arises when a maximum combustion chamber pressure is selected as the characteristic situation in the combustion cycle. In this way, the implicit or explicit calibration may be carried out in a particularly easy and precise manner.

A further advantage arises when the first time curve and the second time curve of the combustion chamber pressure are selected in such a way that each includes a maximum combustion chamber pressure. In this way, it may be ensured for determining the correction factor that the first underlying time curve and the second underlying time curve of the combustion chamber pressure have a resolution which is as high as possible, so that interference, in particular due to measuring inaccuracies and noise, may be reduced in determining the correction factor, making it possible for the correction factor to be determined even more accurately.

A similar advantage arises when the first time curve and the second time curve of the combustion chamber pressure are selected in such a way that each includes a top dead center of the piston. At least in the compression stroke, the top dead center is associated with a maximum combustion chamber pressure.

DETAILED DESCRIPTION

Figure 1:
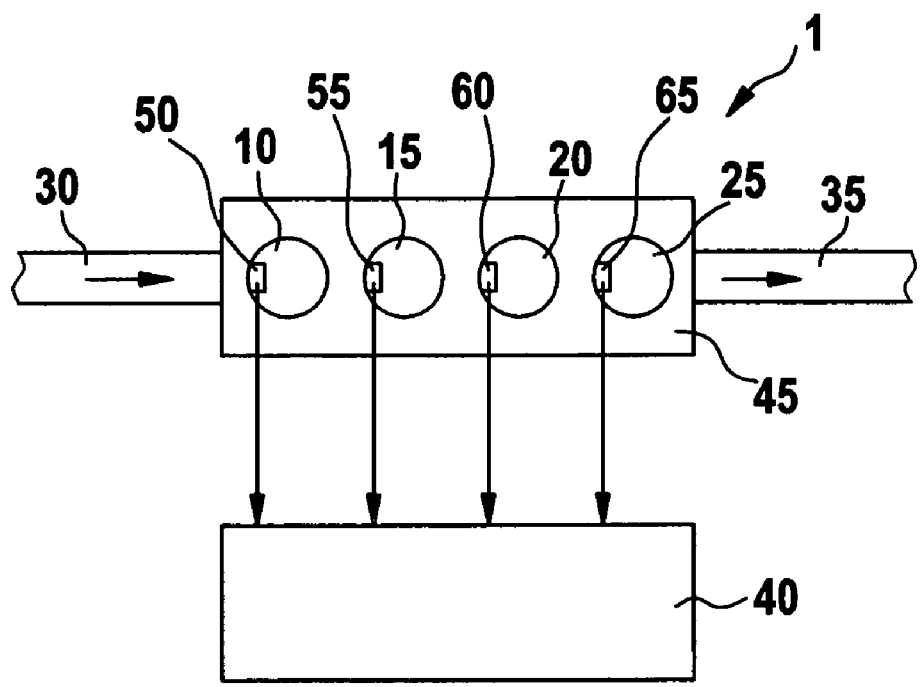
FIG. 1 shows a simplified schematic view of an internal combustion engine.

In FIG. 1, reference numeral 1 denotes an internal combustion engine which, for example and without exclusion of generality, may be designed as a diesel engine or a gasoline engine. Internal combustion engine 1 drives, for example and without exclusion of generality, a vehicle. According to the example in FIG. 1, internal combustion engine 1 includes an engine block 45 in which four cylinders 10, 15, 20, 25 are situated and which, in a manner known to those skilled in the art, are used to operate internal combustion engine 1 according to the four stroke principle, for example. In the example in FIG. 1, a first combustion chamber pressure sensor 50 is situated in a combustion chamber of a first cylinder 10, a second combustion chamber pressure sensor 55 is situated in a combustion chamber of a second cylinder 15, a third combustion chamber pressure sensor 60 is situated in a combustion chamber of a third cylinder 20, and a fourth combustion chamber pressure sensor 65 is situated in a combustion chamber of a fourth cylinder 25. In a manner known to those skilled in the art, combustion chamber pressure sensors 50, 55, 60, 65 detect the pressure in the combustion chamber of the respective associated cylinder and convey a corresponding measuring signal to a control unit 40 of internal combustion engine 1. Cylinders 50, 55, 60, 65 of internal combustion engine 1 are supplied with air via an intake port 30, whereas the exhaust gas formed during combustion in the combustion chambers of cylinders 10, 15, 20, 25 is ejected into an exhaust system 35. For the sake of clarity, fuel injection and—in the case of a gasoline engine—spark ignition are not shown in FIG. 1 and take place also in a manner known to those skilled in the art.

The method according to the present invention is described in the following as an example for first cylinder 10 and first combustion chamber pressure sensor 50; it may, however, also be similarly used for the remaining cylinders 15, 20, 25 having the remaining combustion chamber pressure sensors 55, 60, 65. The method according to the present invention works as follows.

Figure 2:
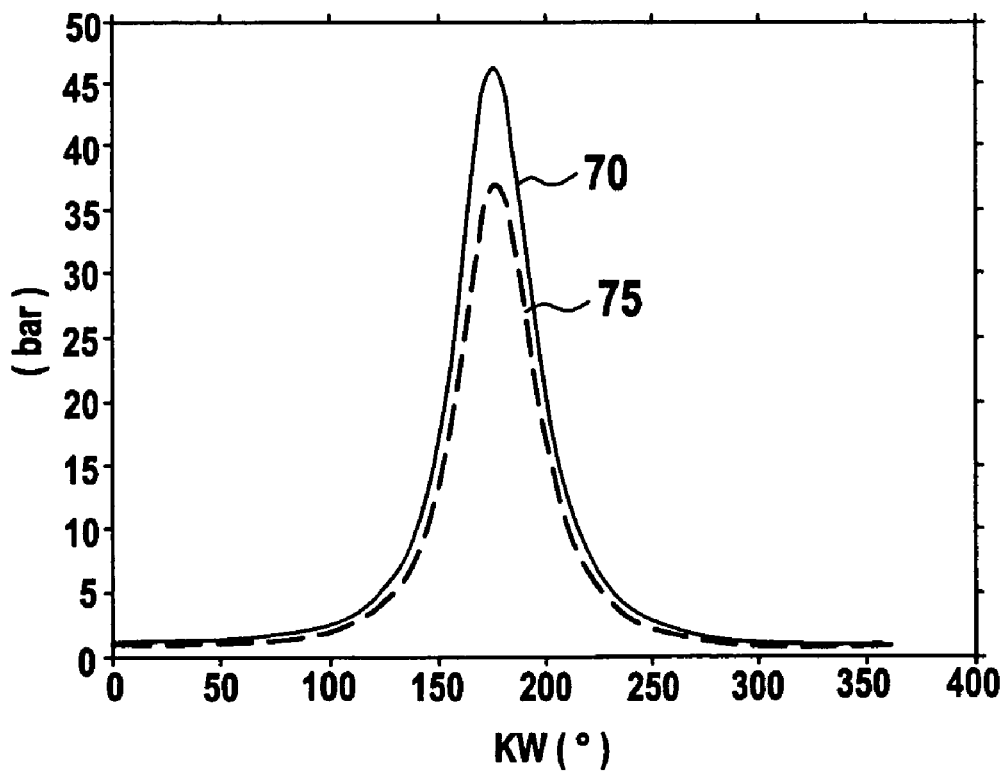
FIG. 2 shows two combustion chamber pressure curves plotted against the crankshaft angle

In a first state of internal combustion engine 1, the new condition of internal combustion engine 1, for example, first combustion chamber pressure sensor 50 detects a first time curve 70 of the combustion chamber pressure in first cylinder 10, as shown in FIG. 2. First time curve 70 of the combustion chamber pressure is shown in bars against crankshaft angle KW in degrees. According to the example in FIG. 2, a section of first time curve 70 of the combustion chamber pressure which includes a pressure maximum, preferably an absolute pressure maximum, in a compression phase of first cylinder 10, is used in an advantageous manner for the execution according to the present invention. In this way, the method according to the present invention is less susceptible to interference and thus more accurate. First time curve 70 and the section, shown in FIG. 2, with the combustion chamber pressure maximum in a compression phase of first cylinder 10 are stored in control unit 40. A second time curve 75 of the combustion chamber pressure in first cylinder 10 detected by first combustion chamber pressure sensor 50 for a consecutive state of internal combustion engine 1, the instantaneous operating state of internal combustion engine 1 for example, is also stored in control unit 40 and is also shown in the diagram of FIG. 2. Both time curves 70, 75 may be detected, for example, in a coasting mode of internal combustion engine 1. FIG. 2 again shows a section from second curve 75 of the combustion chamber pressure which includes an absolute combustion chamber pressure maximum in the compression phase of first cylinder 10. It is apparent that the pressure values of second time curve 75 are lower compared to the pressure values of first time curve 70 (at the same crankshaft angle KW), both absolute maxima of first time curve 70 and second time curve 75 according to FIG. 2 being plotted against the same crankshaft angle KW. It may be the case that over time a drift of the time curve of the combustion engine pressure occurs between the recording of first time curve 70 and second time curve 75, so that the maximum of first time curve 70 no longer coincides with the maximum of second time curve 75. Calibration of the two time curves 70, 75 is necessary in this case. This calibration may also take place via a characteristic situation in the combustion cycle of cylinder 10, for example; this characteristic situation in the combustion cycle may be selected in such a way, for example, that it corresponds to a maximum combustion chamber pressure or to a top dead center of first cylinder 10 in the compression phase. This is particularly easy to implement during a coasting operation of internal combustion engine 1. However, any other position of the time curve of the combustion chamber pressure may also be selected, e.g., a positively rising signal flank having an approximately 50% signal excursion, i.e., a pressure which corresponds to approximately half the absolute maximum combustion chamber pressure of the respective time curve of the combustion chamber pressure. According to the diagram in FIG. 2, both time curves 70, 75 are already in phase, either because the above-described drift of second time curve 75 vis-à-vis first time curve 70 did not take place or because both time curves 70, 75 have been calibrated in the described manner.

According to the present invention, both time curves 70, 75 are compared with one another. A correction factor is determined as a function of the comparison result. The combustion chamber pressure of first cylinder 10 determined by first combustion chamber pressure sensor 50 is then corrected via multiplication by the correction factor. The combustion chamber pressure of first cylinder 10 measured by first combustion chamber pressure sensor 50, corrected in this way, is thus the combustion chamber pressure which would have been measured by first combustion chamber pressure sensor 50 in the first named state of internal combustion engine 1, i.e., in the present example, the new condition according to first time curve 70.

The pressure values of second time curve 75, which are lower in comparison to those of first time curve 70, result, for example, from aging and/or contamination of first combustion chamber pressure sensor 50 in the combustion chamber of first cylinder 10, aging being a consequence, in particular, of the thermal stress and the pressure load on first combustion chamber pressure sensor 50 in the combustion chamber of first cylinder 10.

The method according to the present invention may be implemented as follows, for example: A combustion chamber pressure value is determined from first time curve 70 and from second time curve 75 of the combustion chamber pressure at multiple reference points which are predefined equally for both time curves 70, 75. Both in-phase curves 70, 75 according to FIG. 2 may be scanned at predefined crankshaft angles. This results in one combustion chamber pressure value pair for each scanned crankshaft angle KW, the pair being composed of a first combustion chamber pressure value of first time curve 70 at the corresponding crankshaft angle and a second combustion chamber pressure value of second time curve 75 at the same crankshaft angle. Thus, the absolute crankshaft angles at which first time curve 70 and second time curve 75 according to FIG. 2 are scanned for forming the described combustion chamber pressure value pairs are used as the above-mentioned reference points in this case. Alternatively to the crankshaft angles, absolute points in time may also be selected as reference points; the two time curves 70, 75 may also be plotted against the time instead of against the crankshaft angles.

Figure 3:
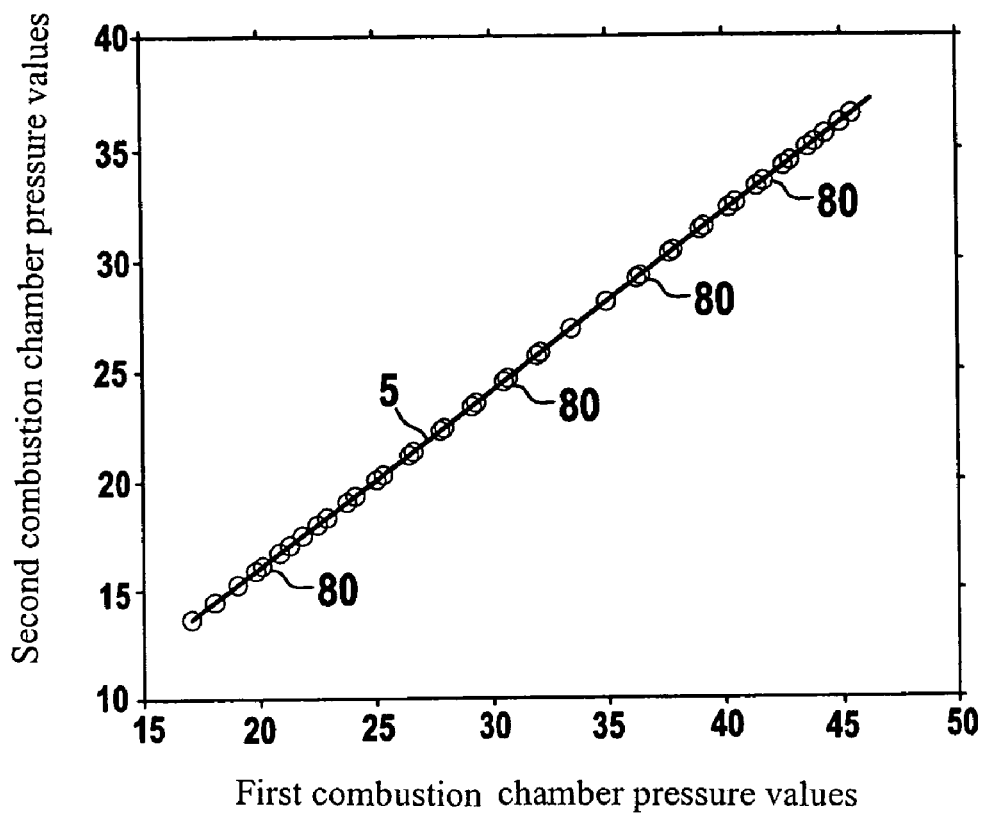
FIG. 3 shows a mean straight line.

In the next step, the combustion chamber pressure value pairs for the reference points used are plotted in a diagram according to the example in FIG. 3. The second combustion chamber pressure values of second time curve 75 determined at the reference points are plotted against the first combustion chamber pressure values of first time curve 70 determined at the reference points at least for two reference points used. However, according to FIG. 3, the combustion chamber pressure value pairs have been plotted in the form of measured points for a plurality of reference points. Some of the measured points are indicated with substitute reference numeral 80. In this way, according to the diagram in FIG. 3, the associated combustion chamber pressures of first time curve 70 and second time curve 75 are brought into relation with one another for at least two reference points.

In a further step, using measuring steps 80 which result in the diagram of FIG. 3, a mean straight line 5 is determined which shows the relationship between the combustion chamber pressures of the two time curves 70, 75 assigned to one another via the at least two reference points. As a rule, measured points 80 are not situated directly on mean straight line 5, so that mean straight line 5 represents averaging of the relationship between the second combustion chamber pressure values of second time curve 75 and the first combustion chamber pressure values of first time curve 70 and, in this way, further interference and noise are reduced during detection of the measured values by first combustion chamber pressure sensor 50. The correction factor is then formed as a function of the slope of mean straight line 5. It results in the described example from the reciprocal of the slope of mean straight line 5. In the described example of FIG. 3, the slope of the mean straight line is indicated as 0.8, resulting in a value of 1.25 for the correction factor.

Figure 4:
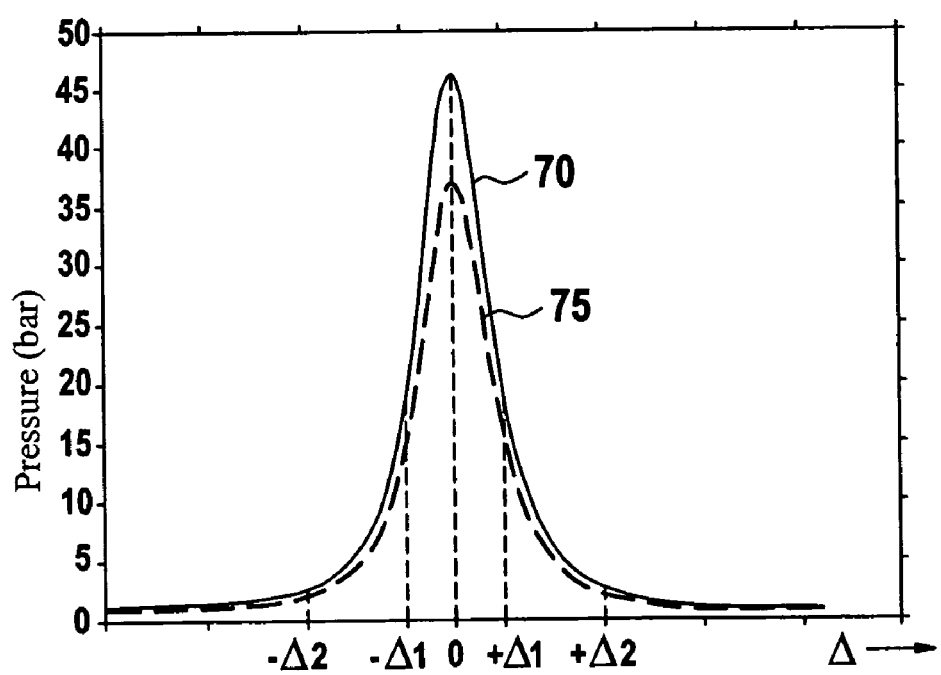
FIG. 4 shows two combustion chamber pressure curves plotted against the deviation from a combustion chamber peak pressure.

According to an alternative embodiment, different time intervals and angle distances of a characteristic situation in the combustion cycle of associated cylinder 10, in particular during a coasting operation of internal combustion engine 1 may be selected as reference points, the characteristic situation being predefined equally for both time curves 70, 75 of the combustion chamber pressure. The characteristic situation in the combustion cycle of first cylinder 10 may be selected as described earlier, e.g., as a maximum combustion chamber pressure; a relative maximum as well as the absolute maximum in the compression phase of first cylinder 1 may be selected. The absolute maximum may be determined particularly easily during a coasting operation of internal combustion engine 1. As an example, it is assumed in the following that the absolute maximum of the combustion chamber pressure is selected as the characteristic situation in the combustion cycle. This occurs at the top dead center during the compression phase of first cylinder 1. According to the diagram in FIG. 4, the two time pressure curves 70, 75 of the combustion chamber pressure are plotted against the time intervals or angle distances of both time curves 70, 75 of the combustion chamber pressure from the absolute maximum. These time intervals or angle distances are indicated with reference symbol $\Delta$. The absolute maximum of both time curves 70, 75 for $\Delta=0$ and a first positive time interval or angle distance $\Delta 1$ from the absolute maximum of first time curve 70 and from the absolute maximum of second time curve 75, a correspondingly value-identical negative distance $-\Delta 1$, with respect to value, a larger time interval or angle distance $+\Delta 2$, and a correspondingly value-identical second negative time interval or angle distance $-\Delta 2$ are shown as reference points as an example in FIG. 4. The distances are always calculated starting from the time or the crankshaft angle of the absolute maximum of first time curve 70 and from the time or the crankshaft angle of the absolute maximum of second time curve 75. More or less, but at least two, reference points may be used. Combustion chamber pressure value pairs of first time curve 70 and second time curve 75 are in turn associated with the reference points predefined according to this alternative embodiment as described in FIG. 2, i.e., a first combustion chamber pressure value of first time curve 70 and a second combustion chamber value of second time curve 75 are associated with each of the reference points. This makes it possible, as described in connection with the first exemplary embodiment, to correspondingly plot the second combustion chamber pressure values against the first combustion chamber pressure values as shown in FIG. 2, to similarly establish a mean straight line via the formed measured points, and to form from there the slope of the mean straight line and the correction factor in the described manner. The alternative embodiment according to FIG. 4 has the advantage that additional calibration of the two time curves 70, 75 of the combustion chamber pressure may be avoided because such a calibration implicitly results due to the selection of the reference points as the time intervals or angle distances from the characteristic situation in the combustion cycle of associated first cylinder 10 which is predefined equally for both time curves 70, 75 of the combustion chamber pressure.

Since the absolute maximum combustion chamber pressure in first cylinder 10 occurs as a rule at the top dead center of first cylinder 10, first time curve 70 and second time curve 75 of the combustion chamber pressure may be selected for the method according to the present invention in such a way that both time curves 70, 75 each include the top dead center, in particular in the compression phase of first cylinder 10.

Figure 5:
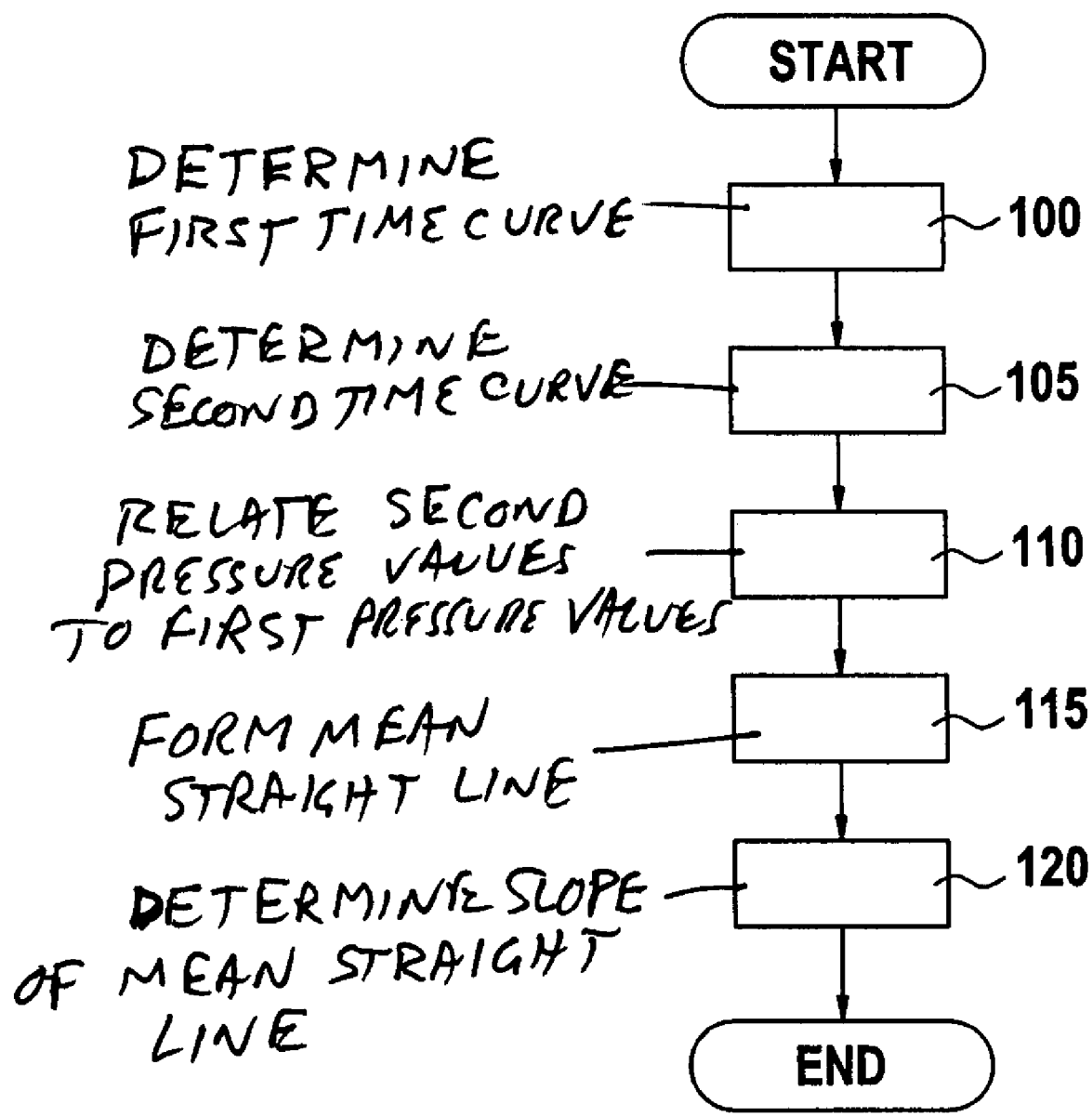
FIG. 5 shows a flow chart for explaining the method according to the present invention.

An exemplary sequence of the method according to the present invention is described by the flow chart in FIG. 5. This flow chart is processed by control unit 40.

After start of the program, control unit 40 determines first time curve 70 of the combustion chamber pressure in first cylinder 10 from the measuring signal of first combustion chamber pressure sensor 50 and, in the described manner, scans the first time curve at the reference points predefined by control unit 40 to obtain the first combustion chamber pressure values. The program subsequently branches to point 105.

At program point 105, control unit 40 determines second time curve 75 of the combustion chamber pressure in first cylinder 10 from the measuring signal of first combustion chamber pressure sensor 50 and scans the second time curve at the predefined reference points. It is to be assumed that both time curves 70, 75 are calibrated either explicitly or implicitly by using the alternatively predefined reference points according to the exemplary embodiment of FIG. 4. By scanning second time curve 75 at the predefined reference points, control unit 40 determines the second combustion chamber pressure values in the described manner. The program subsequently branches to point 110.

At program point 110, control unit 40 relates the second combustion chamber pressure values in the described manner to the first combustion chamber pressure values according to measured points 80 in FIG. 3. The program subsequently branches to point 115.

At program point 115, control unit 40 forms mean straight line 5 via measured points 80 in the described manner. The program subsequently branches to point 120.

At program point 120, control unit 40 determines the slope of mean straight line 5 and determines, from the reciprocal of the slope, the correction factor for correcting the combustion chamber pressures in the combustion chamber of first cylinder 10 which are measured by first combustion chamber pressure sensor 50. The program is subsequently terminated.

The described method may also be used for the remaining combustion chamber pressure sensors 55, 60, 65 of remaining cylinders 15, 20, 25 in the same manner so that, when all combustion chamber pressure sensors 50, 55, 60, 65 are used, the measuring signals of all combustion chamber pressure sensors 50, 55, 60, 65 are calibrated during engine operation, making it possible to increase the accuracy of the combustion chamber or cylinder pressure analysis of all cylinders 10, 15, 20, 25. Combustion chamber pressure sensors 50, 55, 60, 65 are thus calibrated against each other, calibration of each of combustion chamber pressure sensors 50, 55, 60, 65 taking place in the described manner independently from the calibration of the remaining cylinders, so one may refer to an absolute calibration of combustion chamber pressure sensors 50, 55, 60, 65 in contrast to a calibration of a measuring signal of a combustion chamber pressure sensor with the aid of the measuring signal of another combustion chamber pressure sensor. For a reliable comparison, both time curves 70, 75 should preferably be determined under the same operating conditions of the internal combustion engine, with regard to speed and load in particular.

The method according to the present invention enables the determination of a correction of a combustion chamber pressure measured by a combustion chamber pressure sensor independently from an offset of this combustion chamber pressure sensor's measuring signal. Determination of both time curves 70, 75 of the combustion chamber pressure has been described above using a combustion chamber pressure sensor. The combustion chamber pressure may alternatively also be modeled in a manner known to those skilled in the art as a function of the performance quantities of internal combustion engine 1 so that both time curves 70, 75 may also be obtained via modeling from performance quantities of internal combustion engine 1 instead of, as described above, from measuring signals of a combustion chamber pressure sensor.

Different characteristics or cylinder pressure characteristics, such as indicated mean pressure pmi or certain conversion points of the heat curve, may be calculated from the combustion chamber pressure curve or the cylinder pressure curve in a manner known to those skilled in the art. A cylinder-individual regulation may then be based on these characteristics. A more accurate adjustment of the setpoint torques and a better balancing of the cylinders in all operating ranges of the infernal combustion engine may be achieved due to the regulation of the indicated average pressure of cylinders 10, 15, 20, 25. Indicated mean pressure pmi results from a combustion chamber pressure weighted and averaged with the combustion chamber volume based on the displaced volume of the respective cylinder; indicated mean pressure pmi results in particular according to the following formula:

$$pmi = \frac{\frac{\int pdV}{V}}{\text{displaced volume}}$$

where p is the cylinder or combustion chamber pressure of the respective cylinder as a function of the crankshaft angle, V is the combustion chamber volume of the respective cylinder as a function of the crankshaft angle, and the displaced volume is the total displaced volume of the respective cylinder.

Furthermore, the method according to the present invention is used for detecting errors such as a hysteresis of the respective combustion chamber pressure sensor or piston knock.

Due to errors such as hysteresis or piston knock, measured points 80 deviate further from mean straight line 5 than would normally be the case. It is possible to detect an error when the distance from the mean straight line exceeds a calibration value which may be determined on the engine test bench. A pressure signal affected by hysteresis lies in the ascending branch of the time curves of FIGS. 2 and 4 below the real pressure and in the descending branch of the time curves of FIGS. 2 and 4 above the real pressure. Piston knock causes an oscillation on the pressure signal.

The correction factor may also be used to correct indicated mean pressure pmi by multiplying indicated mean pressure pmi by the correction factor, provided the combustion chamber pressure curves, used for determining indicated mean pressure pmi, have not yet been multiplied by the correction factor and thus corrected. Indicated mean pressure pmi thus also represents a combustion chamber pressure correctible via the correction factor. Any combustion chamber or cylinder pressure which is based on a measurement by a combustion chamber pressure sensor or on modeling from operating characteristics of internal combustion engine 1 may be corrected in the described manner via the correction factor.

If both time curves 70, 75' are obtained by modeling from performance quantities of internal combustion engine 1, a decrease in the combustion chamber pressure values during modeling of second time curve 75 vis-à-vis modeling of first time curve 70 is based on the fact, for example, that the sensors used for determining the performance quantities of internal combustion engine 1, which are needed for modeling, are subject to certain aging, certain wear and tear and, as a rule, certain contamination.

The method according to the present invention is correspondingly usable for any combustion chamber and is not restricted to use in an internal combustion engine.

What is claimed is:

1. A method for correcting a determined combustion chamber pressure, comprising:
    comparing a first time curve of the combustion chamber pressure with a second time curve of the combustion chamber pressure in order to produce a comparison result;
    determining a correction factor as a function of the comparison result; and
    correcting the determined combustion chamber pressure via the correction factor.

2. The method as recited in claim 1, further comprising:
determining a first combustion chamber pressure value from the first time curve and a second combustion chamber pressure value from the second time curve, the determining being performed at multiple reference points that are predefined equally for the first time curve and the second time curve;
bringing into relation with one another for at least two of the multiple reference points the first combustion chamber pressure value and the second combustion chamber pressure value;
determining a mean straight line that shows a relationship between the first combustion chamber pressure value and the second combustion pressure value via the at least two reference points; and
forming the correction factor as a function of a slope of the mean straight line.

3. The method as recited in claim 2, wherein the multiple reference points include one of crankshaft angles and absolute points in time.

4. The method as recited in claim 2, wherein:
the multiple reference points include one of different time intervals and angle distances,
the one of the different time intervals and the angle distances are of a characteristic situation in a combustion cycle of an associated cylinder of an internal combustion engine, and
the characteristic situation is predefined equally for the first time curve and the second time curve.

5. The method as recited in claim 1, further comprising:
calibrating the first time curve and the second time curve to a characteristic situation of a combustion cycle of an associated cylinder of an internal combustion engine.

6. The method as recited in claim 5, further comprising:
selecting a maximum combustion chamber pressure as the characteristic situation in the combustion cycle.

7. The method as recited in claim 1, further comprising:
selecting the first time curve and the second time curve in such a way that each one of the first time curve and the second time curve includes a maximum combustion chamber pressure.

8. The method as recited in claim 1, further comprising:
selecting the first time curve and the second time curve in such a way that the first time curve and the second time curve each includes a top dead center of a piston.

9. The method as recited in claim 1, wherein the combustion chamber pressure is of an internal combustion engine.

* * * * *